(12) United States Patent
Yoshino et al.

(10) Patent No.: US 9,085,231 B2
(45) Date of Patent: Jul. 21, 2015

(54) ROUGH TERRAIN VEHICLE

(71) Applicant: HONDA MOTOR CO., LTD., Minato-Ku, Tokyo (JP)

(72) Inventors: Hiroki Yoshino, Wako (JP); Hajime Uchiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/493,856

(22) Filed: Sep. 23, 2014

(65) Prior Publication Data

US 2015/0090510 A1 Apr. 2, 2015

(30) Foreign Application Priority Data

Sep. 27, 2013 (JP) ................................. 2013-200934

(51) Int. Cl.
*B60K 11/04* (2006.01)
*B60K 11/08* (2006.01)
*B60R 19/52* (2006.01)
*F28D 1/02* (2006.01)

(52) U.S. Cl.
CPC ................. *B60K 11/08* (2013.01); *B60K 11/04* (2013.01); *B60R 19/52* (2013.01); *F28D 1/02* (2013.01); *B60R 2019/525* (2013.01)

(58) Field of Classification Search
CPC ........ B60K 11/04; B60K 11/08; B60K 11/06; B60R 19/52; B60R 19/2019; B60R 19/525; B60R 19/527; B60R 19/522
See application file for complete search history.

(56) References Cited

U.S. PATENT DOCUMENTS

| 3,688,856 | A * | 9/1972 | Boehm et al. ................. 180/190 |
| 5,251,718 | A * | 10/1993 | Inagawa et al. ............... 180/190 |
| 6,216,809 | B1 * | 4/2001 | Etou et al. ..................... 180/68.3 |
| 6,988,573 | B2 * | 1/2006 | Tsuruta et al. ............... 180/68.1 |
| 7,887,125 | B2 * | 2/2011 | Tazaki et al. ............... 296/193.1 |
| 7,984,780 | B2 * | 7/2011 | Hirukawa ..................... 180/68.6 |
| 8,196,998 | B2 * | 6/2012 | Ohno et al. ............. 296/193.09 |
| 8,276,699 | B2 * | 10/2012 | Elhardt et al. ............... 180/68.6 |
| 8,347,994 | B2 * | 1/2013 | Bering et al. ................ 180/68.3 |
| 2004/0124028 | A1 * | 7/2004 | Lachapelle et al. ........... 180/291 |
| 2007/0175824 | A1 * | 8/2007 | Togawa et al. ................ 210/618 |
| 2007/0252396 | A1 * | 11/2007 | Kang et al. .................... 293/115 |
| 2008/0079271 | A1 * | 4/2008 | Maruko ........................ 293/102 |
| 2008/0157566 | A1 * | 7/2008 | Tazaki et al. ............... 296/193.1 |
| 2009/0001736 | A1 * | 1/2009 | Makino ........................ 293/115 |
| 2009/0139786 | A1 * | 6/2009 | Lee ............................. 180/68.1 |
| 2009/0273196 | A1 * | 11/2009 | Ayabe et al. .................. 293/115 |
| 2010/0089674 | A1 * | 4/2010 | Oka et al. .................... 180/68.1 |
| 2010/0244481 | A1 * | 9/2010 | Ohno et al. ..................... 296/82 |

(Continued)

*Primary Examiner* — Hau Phan
*Assistant Examiner* — Jacob Meyer
(74) *Attorney, Agent, or Firm* — Carrier Blackman & Associates, P.C.; Joseph P. Carrier; William D. Blackman

(57) ABSTRACT

A rough terrain vehicle capable of maintaining the cooling performance of a radiator is disclosed herein. A rough terrain vehicle in which a radiator is arranged between left and right front wheels and so as to be overlapped with the left and right front wheels in the longitudinal direction of the vehicle, and the radiator is surrounded by a front cover, wherein: the front cover includes a grille configured to introduce traveling wind into the radiator, and extension portions extending toward the vehicle rear from both ends of the grille in the vehicle width direction; a bumper is attached to a body frame; the front end of the bumper is arranged closer to the vehicle front than the front ends of the left and right front wheels; the extension portions are arranged between the bumper and the radiator outside the radiator in the vehicle width direction.

17 Claims, 6 Drawing Sheets

(56) References Cited

U.S. PATENT DOCUMENTS

| | | | |
|---|---|---|---|
| 2011/0006553 A1* | 1/2011 | Fretz et al. | 293/115 |
| 2011/0186371 A1* | 8/2011 | Berg et al. | 180/190 |
| 2012/0031693 A1 | 2/2012 | Deckard et al. | |
| 2012/0080255 A1* | 4/2012 | Elhardt et al. | 180/68.6 |
| 2012/0261202 A1* | 10/2012 | Bering et al. | 180/68.1 |
| 2013/0033070 A1* | 2/2013 | Kinsman et al. | 296/190.03 |
| 2013/0134740 A1* | 5/2013 | Hirose | 296/193.1 |
| 2013/0180789 A1* | 7/2013 | Maurer et al. | 180/68.1 |
| 2013/0248141 A1* | 9/2013 | Maurer et al. | 165/44 |
| 2014/0291052 A1* | 10/2014 | Kaita et al. | 180/229 |

* cited by examiner

ROUGH TERRAIN VEHICLE

CROSS-REFERENCE TO RELATED APPLICATIONS

The present disclosure claims priority under 35 USC 119 based on Japanese patent application No. 2013-200934, filed on Sep. 27, 2013. The entire subject matter of this priority document, including specification claims and drawings thereof, is incorporated by reference herein.

The present disclosure relates to improvement in a rough terrain vehicle. United States Patent Application Publication No. 2012-0031693 discloses a vehicle capable of traveling on a rough terrain (see FIG. 3). As shown in FIG. 3 of US2012-0031693, a rough terrain vehicle is provided with a radiator (444) in a position overlapped with front wheels (102) in side view of the vehicle, and a grille in front of the radiator (444).

In the vehicle of US2012-0031693, a gap is formed between the grille and the radiator, and thus mud or the like splashed by the front wheels may enter the gap and attach to a front face of the radiator. This makes it difficult to maintain the cooling performance of the radiator in some cases.

Accordingly, there is a need for a rough terrain vehicle capable of maintaining the cooling performance of a radiator.

SUMMARY

The present disclosure details a rough terrain vehicle capable of maintaining the cooling performance of a radiator.

The disclosed rough terrain vehicle includes left and right front wheels and at least one rear wheel are attached to a body frame, a radiator is arranged between the left and right front wheels and so as to be overlapped with the left and right front wheels in the longitudinal direction of the vehicle in side view thereof, and the radiator is surrounded by a front cover, wherein: the front cover includes a grille extending in the vehicle width direction to introduce traveling wind into the radiator, and extension portions extending toward the vehicle rear from both ends of the grille in the vehicle width direction; a bumper is attached to the body frame; the front end of the bumper is arranged closer to the vehicle front than the front ends of the left and right front wheels; the extension portions closing a gap between the bumper and the radiator are arranged between the bumper and the radiator outside the radiator in the vehicle width direction; and turning performance-improvement portions gradually spreading outward in the vehicle width direction toward the vehicle rear and configured to improve turning performance of the vehicle are provided on outer sides of the extension portions.

The rough terrain vehicle is further characterized in that the turning performance-improvement portions are at least one of: wall portions provided at the rear ends of the extension portions, extending outward in the vehicle width direction, and configured to introduce traveling wind flowing along outer faces of the extension portions further outward in the vehicle width direction; and slits penetrating the extension portions and long in the height direction.

The rough terrain vehicle is further characterized in that the wall portions continuously extend from an upper portion of the radiator to an area below the radiator.

The rough terrain vehicle is further characterized in that the slits are arranged in front portions of the extension portions.

The rough terrain vehicle is further characterized in that concave portions configured to guide traveling wind are formed on outer sides of the extension portions in front of the slits.

The rough terrain vehicle is further characterized in that electric equipment is arranged between the left and right extension portions.

The rough terrain vehicle is further characterized in that inner sides of the extension portions extend along the longitudinal direction of the vehicle.

In a first aspect of the disclosed rough terrain vehicle, the extension portions closing a gap between the bumper and the radiator are arranged between the bumper and the radiator outside the radiator in the vehicle width direction. Specifically, the extension portions of the front cover close the gap between the bumper arranged in front of the front wheels and the radiator arranged beside the front wheels. As a result, it is possible to prevent mud splashed by the front wheels from attaching to a front face of the radiator.

Moreover, the turning performance-improvement portions are provided in the extension portions. The turning performance-improvement portions reduce flow speed of traveling wind moving along the extension portions in the front portion of the vehicle, so that turning performance of the vehicle can be improved.

In a second aspect of the disclosed rough terrain vehicle, the turning performance-improvement portions are at least one of the wall portions and the slits. Traveling wind flowing along the extension portions passes through the slits and is introduced to the inside of the extension portions. The pressure difference between the inside and outside of the extension portions is reduced by allowing a part of the traveling wind flowing along the extension portions to flow into the inside of the extension portions. As a result, the vehicle is less affected by traveling wind flowing outside the extension portions than the case of not providing the slits.

The traveling wind flowing along the extension portions not having passed the slits are separated from the extension portions at the wall portions. By thus providing the turning performance-improvement portions in the extension portions, turning performance of the vehicle can be improved. In addition, the rear ends of outer sides of the extension portions are reinforced by the wall portions.

In a third aspect of the disclosed rough terrain vehicle, the wall portions extend from an upper portion of the radiator to an area below the radiator. Since the wall portions extend to the area below the radiator, deformation of the extension portions can be suppressed in a long region from the top to bottom of the rear ends thereof, as compared to a case where the wall portions do not extend to the area below the radiator. By suppressing deformation of the rear ends of the extension portions, mud guard performance can be maintained while avoiding interference between the extension portions and the radiator.

In a fourth aspect of the disclosed rough terrain vehicle, the slits are arranged in the front portions of the extension portions. While traveling wind is slowed down by hitting the front cover, turning performance of the vehicle can be improved even more by forming the slits in the front portions of the extension portions where the speed of traveling wind is higher than in the rear portions thereof.

In a fifth aspect of the disclosed rough terrain vehicle, the concave portions are formed on outer sides of the extension portions in front of the slits. Traveling wind flowing along the outer sides of the extension portions is guided by the concave portions and introduced smoothly to the slits. Additionally, the extension portions can be reinforced by the concave portions.

In a sixth aspect of the disclosed rough terrain vehicle, the electric equipment is arranged between the left and right extension portions. The left and right extension portions can prevent mud splashed by the front wheels from attaching to the electric equipment.

In a seventh aspect of the disclosed rough terrain vehicle, inner sides of the extension portions extend along the longitudinal direction of the vehicle. Traveling wind having passed between the left and right extension portions is guided by the inner sides of the extension portions that extend along the longitudinal direction of the vehicle. Thus, traveling wind can be smoothly taken into the radiator.

DETAILED DESCRIPTION

Figure 1:
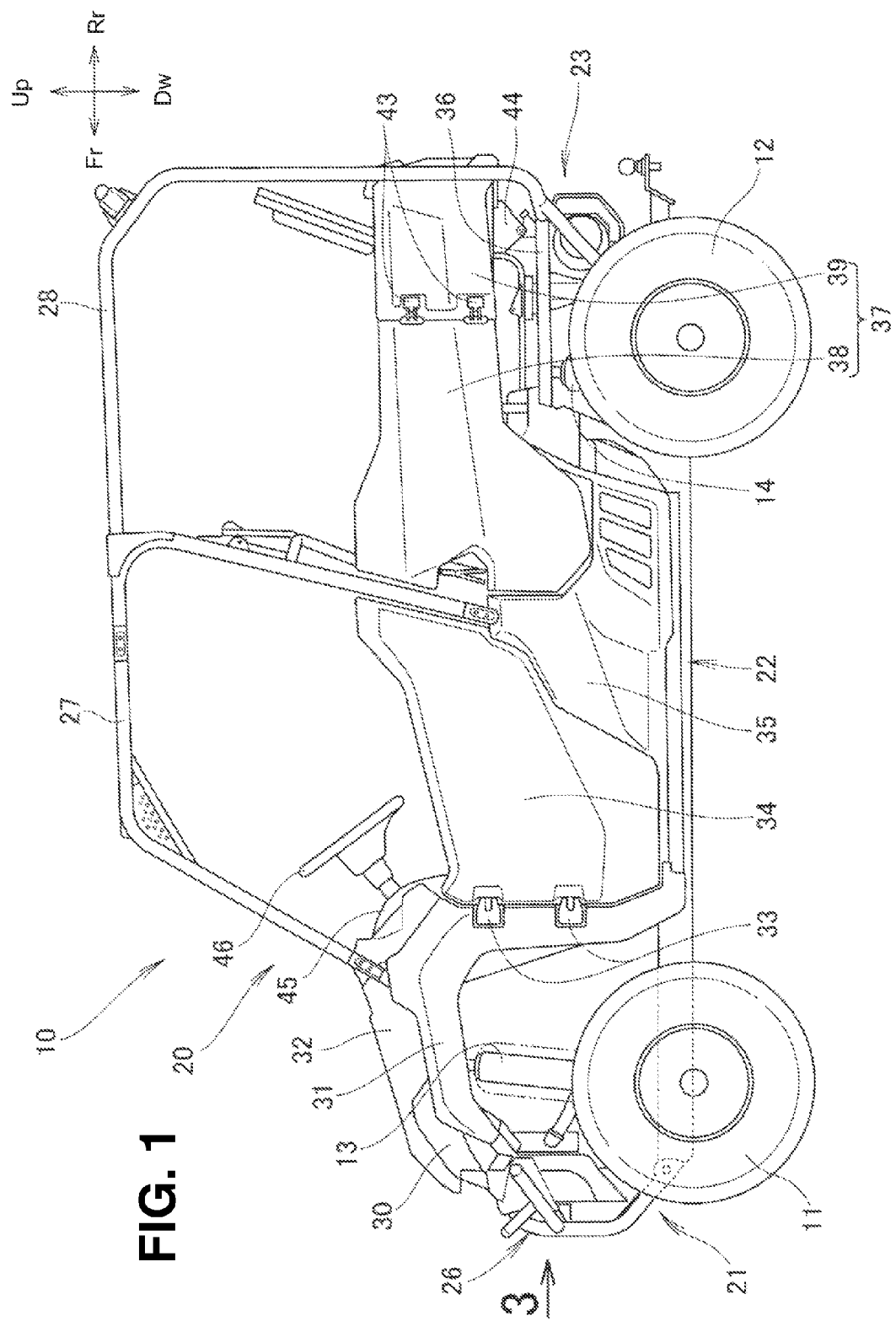
FIG. 1 is a left side view of a rough terrain vehicle according to the present disclosure.

Hereinbelow, a detailed description will be given of an embodiment of the present disclosure. In the drawings and example, each of "up," "down," "front," "rear," "left," and "right" indicates a direction as seen from a driver riding a rough terrain vehicle. An example of the present disclosure will be described with reference to the drawings.

As shown in FIG. 1, a vehicle 10 is a left hand drive rough terrain vehicle having independent suspension on four wheels to travel in rough terrains. Left and right front wheels 11 (FIG. 1 shows only the reference numeral 11 on the near side) are independently suspended by a front cushion 13 on a front portion of a body frame 20, and left and right rear wheels 12 (FIG. 1 shows only the reference numeral 12 on the near side) are independently suspended by a rear cushion 14 on a rear portion of the body frame 20.

The body frame 20 is configured of a front frame 21 on which the front wheels 11 are suspended through the front cushion 13; a center frame 22 extending rearward from the front frame 21; and a rear frame 23 extending rearward from the center frame 22.

A bumper 26 for protecting a front portion of the vehicle is attached to the front end of the front frame 21, and the front end of the bumper 26 is arranged closer to the vehicle front than the front ends of the left and right front wheels 11. A front seat-roll bar 27 having a substantially arched shape in side view of the vehicle is attached to the front frame 21 and center frame 22. Meanwhile, a rear seat-roll bar 28 provided so as to extend rearward from the top rear end of the front seat-roll bar 27, and having a substantial L shape in side view is attached to the front seat-roll bar 27 and rear frame 23.

The front portion of the vehicle 10 includes: a front cover 30 provided in a front end portion to cover the front end of the vehicle 10; a front fender 31 provided in a rear portion of the front cover 30 to cover upper to rear parts of the front wheel 11; a front upper cover 32 provided above the front fender 31 to cover a front upper portion of the vehicle 10; and a front door 34 provided so as to be openable and closable through a hinge 33, in a rear portion of the front fender 31.

A rear portion of the vehicle 10 includes: a side cover 35 arranged behind the front door 34 to cover a side portion of the vehicle 10; and a rear side cover 37 arranged above and behind the side cover 35 to form a loading space 36. A front portion of the rear side cover 37 is configured of a rear door 38, and a rear portion thereof is configured of a rear panel 39 attached to the body frame 20. The rear door 38 is provided so as to be openable and closable through a hinge 43, on the front end of the rear panel 39.

The loading space 36 is supported by the rear frame 23 through a stay 44. The front wheel 11 is supported by the front cushion 13, and the rear wheel 12 is supported by the rear cushion 14. An instrument panel 45 is provided behind the front upper cover 32, and a steering handle 46 is arranged in the vicinity of the instrument panel 45.

Figure 2:
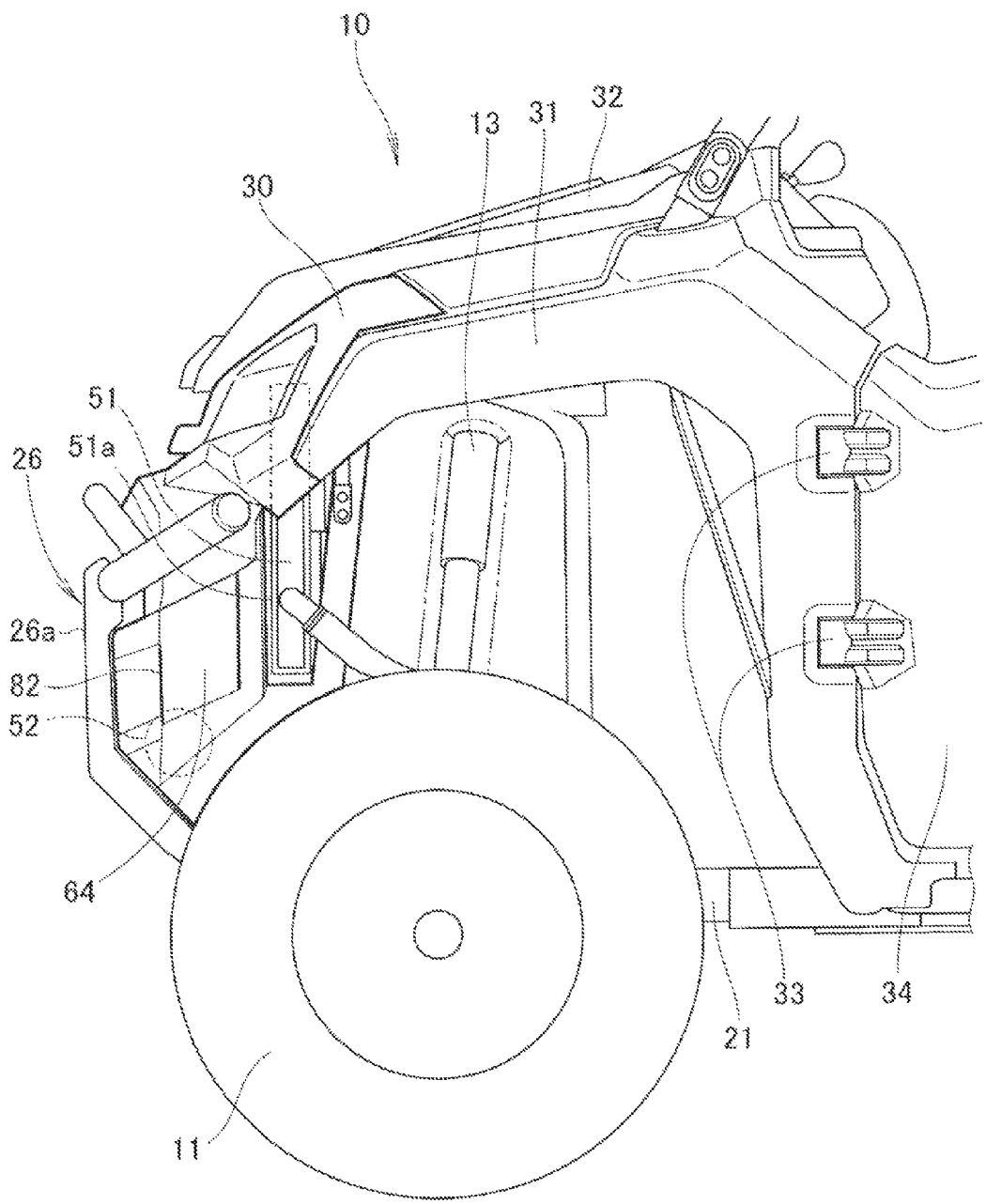
FIG. 2 is an enlarged view of a chief portion of FIG. 1.

As shown in FIG. 2, in the rough terrain vehicle 10, a radiator 51 is arranged between the left and right front wheels 11 and so as to be overlapped with the left and right front wheels 11 in the longitudinal direction of the vehicle in side view thereof. The radiator 51 is surrounded by the front cover 30.

The bumper 26 is attached to the body frame 20 (front frame 21), and a front end 26a of the bumper 26 is arranged closer to the vehicle front than the front ends of the left and right front wheels 11. A winch motor 52 is arranged immediately behind the bumper 26 and in front of the radiator 51.

Figure 3:
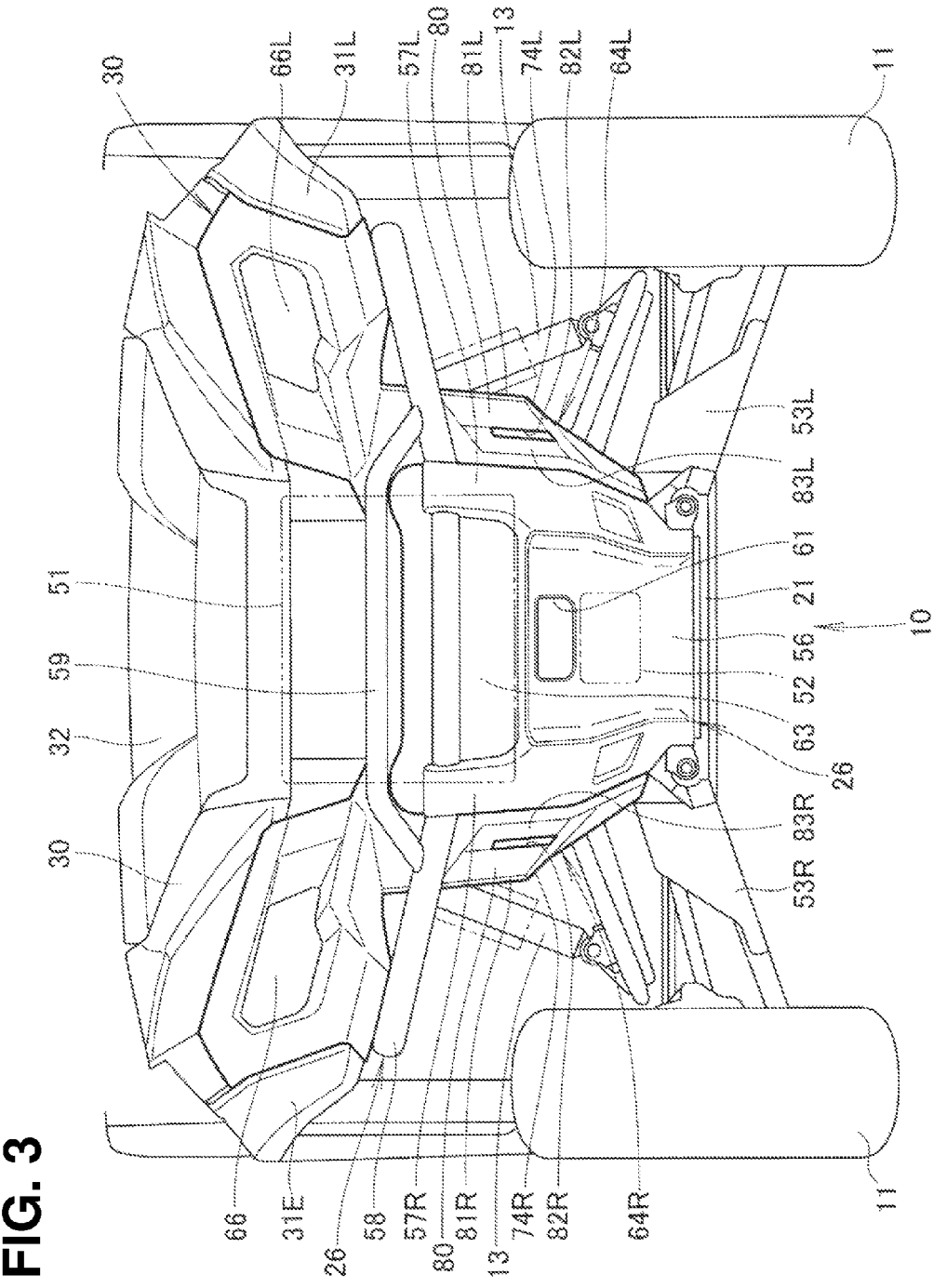
FIG. 3 is a view on arrow 3 of FIG. 1.
Figure 4:
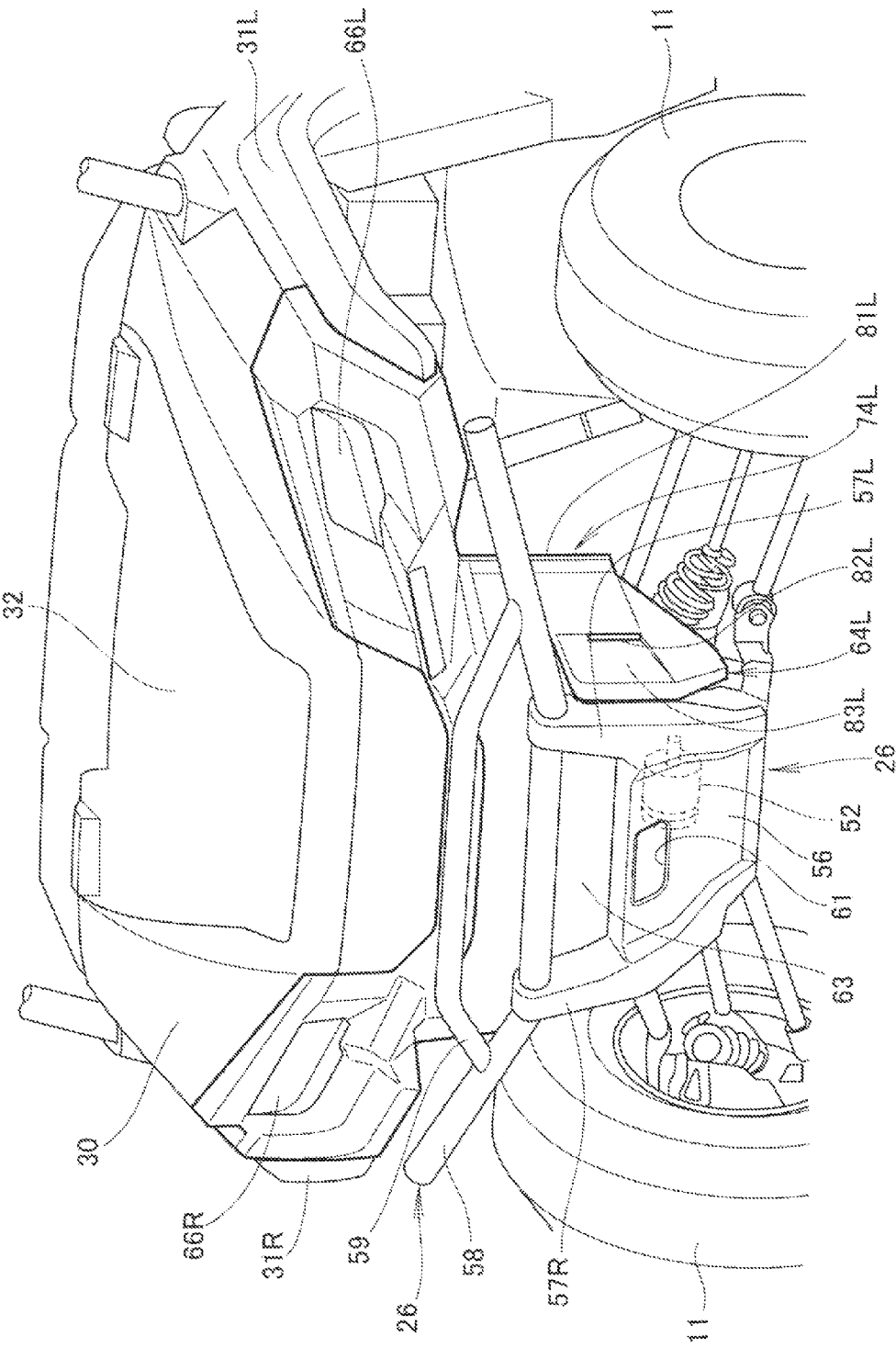
FIG. 4 is a perspective view for explaining a front portion of the rough terrain vehicle.

As shown in FIGS. 3 and 4, left and right suspension frames 53L, 53R are bridged between the front frame 21 and left and right front wheels 11, 11, in addition to the left and right front cushions 13, 13 on which the left and right front wheels 11, 11 are suspended.

The bumper 26 is configured of: a center portion 56 whose bottom end is attached to the front frame 21 to cover a central lower portion of the vehicle; left and right vertical portions 57L, 57R extending upward from left and right end portions of the center portion 56; an arm portion 58 supported by top ends of the left and right vertical portions 57L, 57R and extending substantially horizontally to the left and right in the vehicle width direction; and a sub arm portion 59 bridged across the arm portion 58 outside the left and right vertical portions 57L, 57R in the vehicle width direction. The bumper 26 is arranged in front of the front wheels 11, 11, is a member that protects the front wheels 11, 11, and is made of metal. The winch motor 52 is covered by the center portion 56 of the bumper 26, and the center portion 56 is provided with an opening 61 through which an unillustrated wire can be drawn from and retracted to the winch motor 52.

Figure 5:
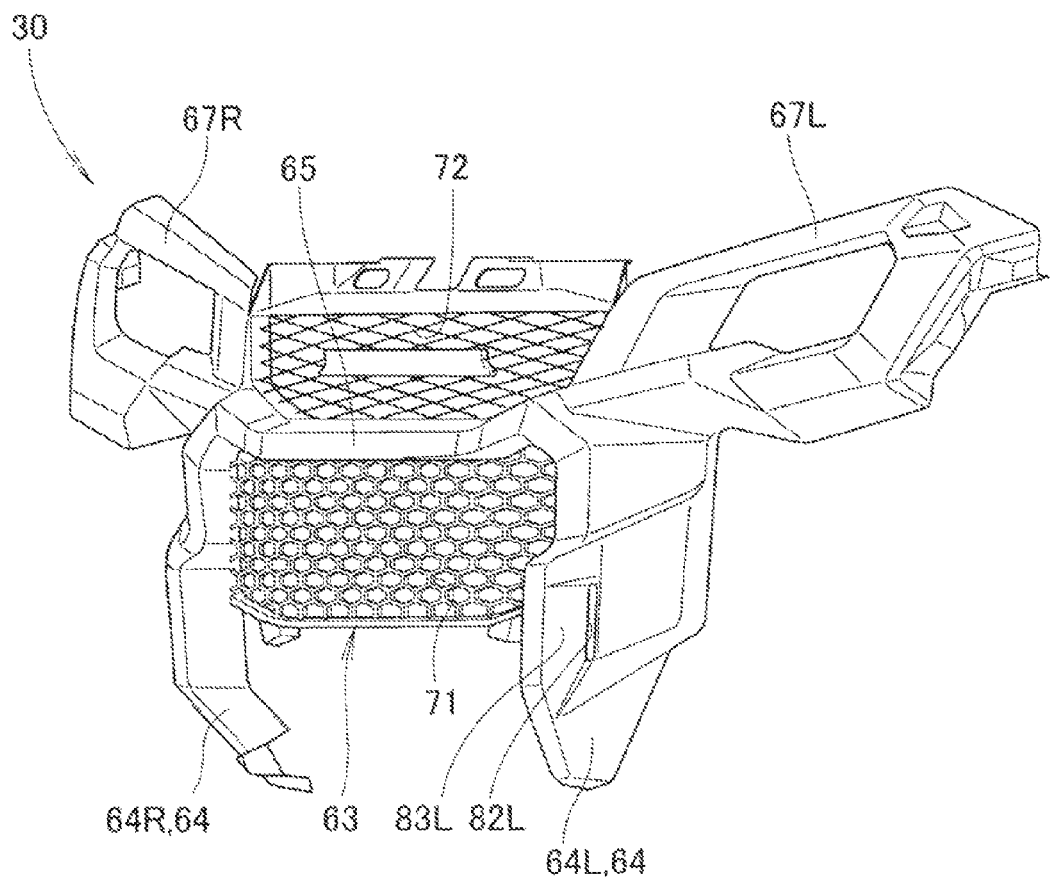
FIG. 5 is a perspective view of a front cover.

Next, a structure of the front cover 30 will be described. As shown in FIG. 5, main elements of the front cover 30 are: a mesh grille 63 extending in the vehicle width direction from the center thereof to introduce traveling wind into the radiator 51; left and right extension portions 64L, 64R extending toward the vehicle rear from both ends of the grille 63 in the vehicle width direction; a cross portion 65 bridged across the left and right extension portions 64L, 64R; and left and right headlight housings 67L, 67R extending outward in the vehicle width direction to surround left and right headlights 66L, 66R (see FIG. 3) on outer sides of the cross portion 65. The front cover 30 is a resin molded article. Note that either of or both of the left and right extension portions and the left and right headlight housings may be separate members.

The grille 63 is a mesh member capable of introducing traveling wind into the vehicle, and is configured of a lower grille portion 71 and an upper grille portion 72. The lower grille portion 71 and upper grille portion 72 are separated by the cross portion 65. The lower grille portion 71 is arranged between the left and right extension portions 64L, 64R. The left and right headlight housings 67L, 67R are arranged above the left and right extension portions 64L, 64R.

Referring back to FIG. 2, the extension portion 64 is arranged between the bumper 26 and radiator 51 outside the radiator 51 in the vehicle width direction. The extension portion 64 is arranged so as to close a gap between the bumper 26 and radiator 51.

Referring back to FIGS. 3 and 4, the left and right extension portions 64L, 64R spread toward the outside of the vehicle so as to cover upper portions of the left and right front cushions 13, 13, respectively. In addition, outer sides 74L, 74R of the left and right extension portions 64L, 64R are provided with turning performance-improvement portions 80, gradually spreading outward in the vehicle width direction toward the vehicle rear and configured to improve turning performance of the vehicle.

The turning performance-improvement portions 80 consist of: left and right wall portions 81L, 81R provided at the rear ends of the left and right extension portions 64L, 64R, extending outward in the vehicle width direction, and configured to introduce traveling wind flowing along outer faces of the left and right extension portions 64L, 64R further outward in the vehicle width direction; and left and right slits 82L, 82R penetrating the left and right extension portions 64L, 64R and long in the height direction. Note that although the turning performance-improvement portions of this example consist of the left and right slits and left and right wall portions, they may consist only of the left and right slits. The turning performance-improvement portions may otherwise consist only of the left and right wall portions, and these may be set arbitrarily.

The left and right wall portions 81L, 81R extend continuously from an upper portion of the radiator 51 to an area below the radiator 51. The slits 82L, 82R are arranged in front portions of the left and right extension portions 64L, 64R. Concave portions 83L, 83R configured to guide traveling wind are formed on outer sides 74L, 74R of the extension portions in front of the slits 82L, 82R.

The aforementioned winch motor 52 as electric equipment is arranged between the left and right extension portions 64L, 64R. Note that although the electric equipment is a winch motor in this example, other kinds of electric equipment may be installed.

Figure 6:
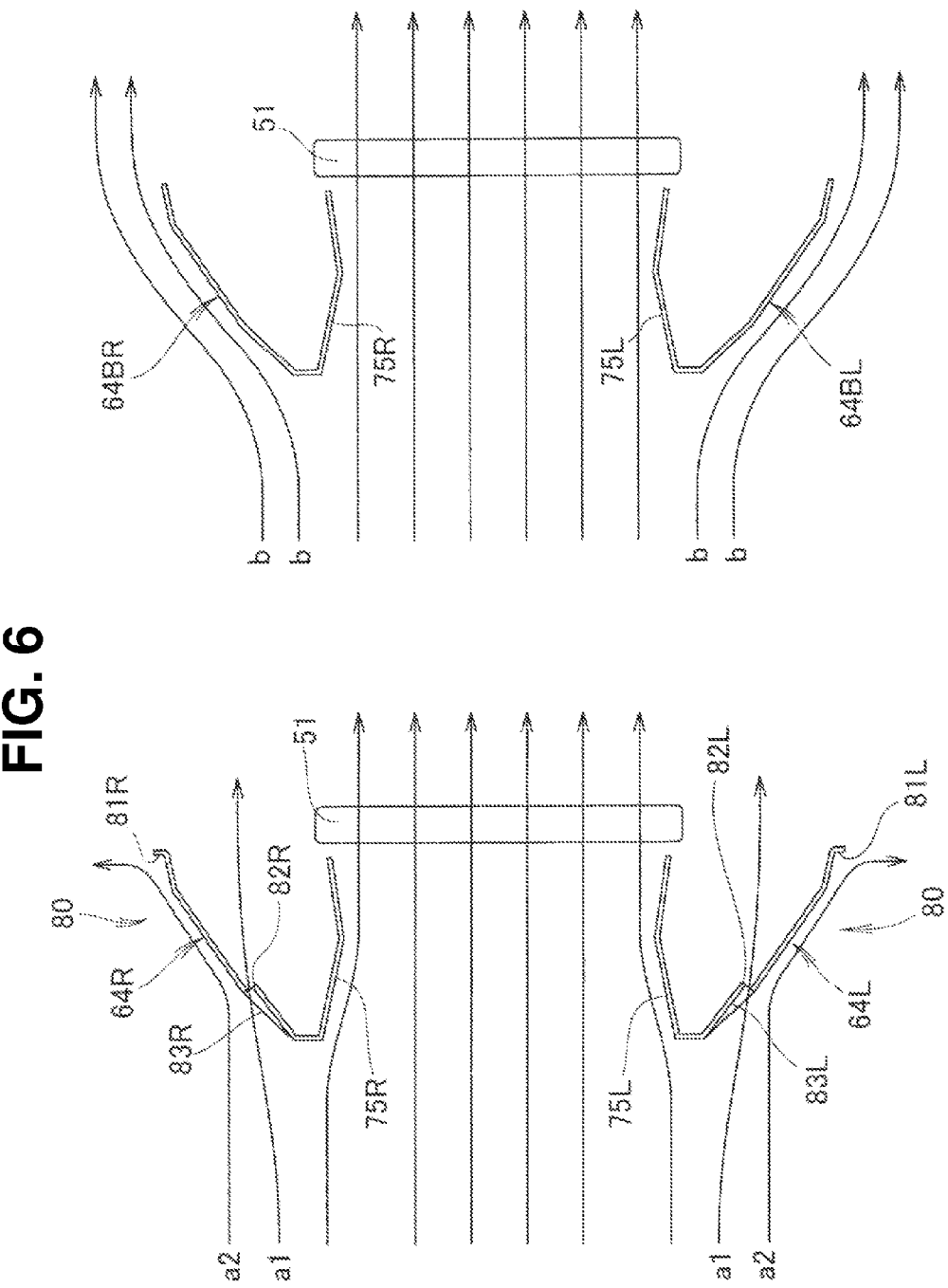
FIG. 6 is a cross-sectional view and diagram explaining effects of a lower portion of the front cover and peripheral parts according to an example and a comparative example.

FIG. 6(a) is a cross-sectional view and diagram explaining effects of a lower portion of the front cover and peripheral parts according to the example, and FIG. 6(b) is a cross-sectional view and diagram explaining effects of the lower portion of the front cover and peripheral parts according to a comparative example.

In FIG. 6(b), left and right extension portions 64BL, 64BR are not provided with turning performance-improvement portions. Hence, traveling wind split by the left and right extension portions 64BL, 64BR are introduced smoothly to the vehicle rear as indicated by arrows b, b in FIG. 6(b). This emphasizes the straight line stability of the vehicle, and therefore leaves room for improvement in turning performance of the vehicle.

Meanwhile, in FIG. 6(a) of the present disclosure, the left and right extension portions 64L, 64R are provided with the turning performance-improvement portions 80. The turning performance-improvement portions 80 consist of the wall portions 81L, 81R and the slits 82L, 82R. Since the slits 82L, 82R are provided in the left and right extension portions 64L, 64R, a part of the traveling wind split by the left and right extension portions 64L, 64R passes through the slits 82L, 82R as indicated by arrows a1, a1 in FIG. 6(a). The part of the traveling wind flowing along the extension portions 64L, 64R passes through the slits 82L, 82R and is introduced to the inside of the extension portions 64L, 64R. The pressure difference between the inside and outside of the extension portions 64L, 64R is reduced by allowing the part of the traveling wind flowing along the extension portions 64L, 64R to flow into the inside of the extension portions 64L, 64R. As a result, the vehicle is less affected by traveling wind flowing outside the extension portions 64L, 64R than the case of not providing the slits.

The wall portions 81L, 81R are also provided in the extension portions 64L, 64R. A part of the traveling wind flowing along the extension portions 64L, 64R not having passed the slits 82L, 82R is separated from the extension portions 64L, 64R at the wall portions 81L, 81R. That is, the part of the traveling wind is introduced by the wall portions 81L, 81R so as to be separated from the extension portions 64L, 64R to outer sides of the vehicle, as indicated by arrows a2, a2 in FIG. 6(a). Flow speed of the traveling wind moving along the extension portions 64L, 64R is thus reduced. In the above configuration, the extension portions 64L, 64R are provided with the turning performance-improvement portions 80 consisting of the slits 82L, 82R and wall portions 81L, 81R. Hence, turning performance of the vehicle can be improved.

Moreover, the slits 82L, 82R are arranged in the front portions of the extension portions 64L, 64R. While traveling wind is slowed down by hitting the front cover 30, turning performance of the vehicle can be improved even more by forming the slits 82L, 82R in the front portions of the extension portions 64R, 64L where the speed of traveling wind is higher than in the rear portions thereof.

Here, the slits 82L, 82R are opened along the front-rear direction of the vehicle. Since the slits 82L, 82R are opened along the front-rear direction of the vehicle instead of being opened sideward in the vehicle width direction, mud splashed by the front wheels 11, 11 (see FIG. 3) is less likely to enter the extension portions 64L, 64R.

Additionally, inner sides 75L, 75R of the left and right extension portions 64L, 64R extend along the longitudinal direction of the vehicle. Traveling wind having passed between the left and right extension portions 64L, 64R is guided by the inner sides 75L, 75R of the extension portions 64L, 64R that extend along the longitudinal direction of the vehicle. Thus, traveling wind can be smoothly taken in and passed through the radiator 51.

Referring back to FIGS. 2 and 5, the extension portions 64L, 64R closing the gap between the bumper 26 and radiator 51 are arranged between the bumper 26 and radiator 51 (in the front-rear direction), outside the radiator 51 in the vehicle width direction. Specifically, the extension portions 64L, 64R of the front cover 30 close the gap between the bumper 26 arranged in front of the front wheels 11, 11 and the radiator 51 arranged beside the front wheels 11, 11. As a result, it is possible to prevent mud splashed by the front wheels 11, 11 from attaching to a front face 51a of the radiator 51.

Moreover, the wall portions 81L, 81R extend from an upper portion of the radiator 51 to an area below the radiator 51. Since the wall portions 81L, 81R extend to the area below the radiator 51, deformation of the extension portions 64L, 64R can be suppressed in a long region from the top to bottom of the rear ends thereof, as compared to a case where the wall portions do not extend to the area below the radiator. By suppressing deformation of the rear ends of the extension portions 64L, 64R, mud guard performance can be maintained while avoiding interference between the extension portions 64L, 64R and the radiator 51.

The slits 82L, 82R are arranged in the front portions of the extension portions 64L, 64R. While traveling wind is slowed down by hitting the front cover 30, turning performance of the vehicle can be improved even more by forming the slits 82L, 82R in the front portions of the extension portions 64R, 64L where the speed of traveling wind is higher than in the rear portions thereof. Additionally, the rear ends of outer sides of the extension portions 64L, 64R are reinforced by the wall portions 81L, 81R, so that rigidity of the extension portions 64L, 64R can be enhanced.

The concave portions 83L, 83R are formed on outer sides of the extension portions 64L, 64R in front of the slits 82L, 82R. Traveling wind flowing along the outer sides 74L, 74R of the extension portions 64L, 64R is guided by the concave portions 83L, 83R and introduced smoothly to the slits 82L, 82R. Additionally, the extension portions 64L, 64R can be reinforced by the concave portions 83L, 83R.

The electric equipment (winch motor 52) is arranged between the left and right extension portions 64L, 64R. The left and right extension portions 64L, 64R can prevent mud splashed by the front wheels from attaching to the electric equipment 52.

The present disclosure is suitable for a rough terrain vehicle provided with a radiator and a front cover in the vehicle front.

The invention claimed is:

1. A rough terrain vehicle in which left and right front wheels and at least one rear wheel are attached to a body frame, a radiator is arranged between said left and right front wheels and so as to be overlapped with the left and right front wheels in the longitudinal direction of the vehicle in side view thereof, and the radiator is surrounded by a front cover, wherein:
    said front cover includes
        a grille extending in the vehicle width direction to introduce traveling wind into said radiator, and
        extension portions extending toward the vehicle rear from both ends of the grille in the vehicle width direction;
    a bumper is attached to said body frame;
    the front end of the bumper is arranged closer to the vehicle front than the front ends of said left and right front wheels;
    said extension portions closing a gap between said bumper and said radiator are arranged between said bumper and said radiator outside said radiator in the vehicle width direction; and
    turning performance-improvement portions gradually spreading outward in the vehicle width direction toward the vehicle rear and configured to improve turning performance of the vehicle are provided on outer sides of the extension portions.

2. The rough terrain vehicle according to claim 1, wherein said turning performance-improvement portions are at least one of: wall portions provided at the rear ends of said extension portions, extending outward in the vehicle width direction, and configured to introduce traveling wind flowing along outer faces of said extension portions further outward in the vehicle width direction; and slits penetrating said extension portions and long in the height direction.

3. The rough terrain vehicle according to claim 2, wherein concave portions configured to guide traveling wind are formed on outer sides of said extension portions in front of said slits.

4. The rough terrain vehicle according to claim 3, wherein electric equipment is arranged between left and right said extension portions.

5. The rough terrain vehicle according to claim 3, wherein inner sides of said extension portions extend along the longitudinal direction of the vehicle.

6. The rough terrain vehicle according to claim 1, wherein electric equipment is arranged between left and right said extension portions.

7. The rough terrain vehicle according to claim 1, wherein inner sides of said extension portions extend along the longitudinal direction of the vehicle.

8. A rough terrain vehicle in which left and right front wheels and at least one rear wheel are attached to a body frame, a radiator is arranged between said left and right front wheels and so as to be overlapped with the left and right front wheels in the longitudinal direction of the vehicle in side view thereof, and the radiator is surrounded by a front cover, wherein:
    said front cover includes
        a grille extending in the vehicle width direction to introduce traveling wind into said radiator, and
        extension portions extending toward the vehicle rear from both ends of the grille in the vehicle width direction;
    a bumper is attached to said body frame;
    the front end of the bumper is arranged closer to the vehicle front than the front ends of said left and right front wheels;
    said extension portions closing a gap between said bumper and said radiator are arranged between said bumper and said radiator outside said radiator in the vehicle width direction; and
    turning performance-improvement portions gradually spreading outward in the vehicle width direction toward the vehicle rear and configured to improve turning performance of the vehicle are provided on outer sides of the extension portions,
    wherein said turning performance-improvement portions are at least one of: wall portions provided at the rear ends of said extension portions, extending outward in the vehicle width direction, and configured to introduce traveling wind flowing along outer faces of said extension portions further outward in the vehicle width direction; and slits penetrating said extension portions and long in the height direction,
    wherein said wall portions continuously extend from an upper portion of said radiator to an area below said radiator.

9. The rough terrain vehicle according to claim 8, wherein said slits are arranged in front portions of said extension portions.

10. The rough terrain vehicle according to claim 8, wherein concave portions configured to guide traveling wind are formed on outer sides of said extension portions in front of said slits.

11. The rough terrain vehicle according to claim 8, wherein electric equipment is arranged between left and right said extension portions.

12. The rough terrain vehicle according to claim 8, wherein inner sides of said extension portions extend along the longitudinal direction of the vehicle.

13. A rough terrain vehicle in which left and right front wheels and at least one rear wheel are attached to a body frame, a radiator is arranged between said left and right front wheels and so as to be overlapped with the left and right front wheels in the longitudinal direction of the vehicle in side view thereof, and the radiator is surrounded by a front cover, wherein:
    said front cover includes
        a grille extending in the vehicle width direction to introduce traveling wind into said radiator, and extension portions extending toward the vehicle rear from both ends of the grille in the vehicle width direction;

a bumper is attached to said body frame;

the front end of the bumper is arranged closer to the vehicle front than the front ends of said left and right front wheels;

said extension portions closing a gap between said bumper and said radiator are arranged between said bumper and said radiator outside said radiator in the vehicle width direction; and turning performance-improvement portions gradually spreading outward in the vehicle width direction toward the vehicle rear and configured to improve turning performance of the vehicle are provided on outer sides of the extension portions, wherein electric equipment is arranged between left and right said extension portions, and wherein inner sides of said extension portions extend along the longitudinal direction of the vehicle.

14. The rough terrain vehicle according to claim 13, wherein said turning performance-improvement portions are at least one of: wall portions provided at the rear ends of said extension portions, extending outward in the vehicle width direction, and configured to introduce traveling wind flowing along outer faces of said extension portions further outward in the vehicle width direction; and slits penetrating said extension portions and long in the height direction.

15. The rough terrain vehicle according to claim 14, wherein said wall portions continuously extend from an upper portion of said radiator to an area below said radiator.

16. The rough terrain vehicle according to claim 15, wherein said slits are arranged in front portions of said extension portions.

17. The rough terrain vehicle according to claim 14, wherein concave portions configured to guide traveling wind are formed on outer sides of said extension portions in front of said slits.

* * * * *